United States Patent [19]
Regal

[11] Patent Number: 5,566,304
[45] Date of Patent: Oct. 15, 1996

[54] METHOD OF DYNAMIC SELECTION BETWEEN IMMEDIATE AND DELAYED READ ACCESS ACKNOWLEDGEMENT

[75] Inventor: Michael L. Regal, Campbell, Calif.

[73] Assignee: Apple Computer, Inc., Cupertino, Calif.

[21] Appl. No.: 437,041

[22] Filed: May 8, 1995

[51] Int. Cl.[6] ..................................... G06F 13/00
[52] U.S. Cl. .................. 395/285; 395/824; 364/240; 364/240.5; 364/240.8; 364/DIG. 1; 364/240.9
[58] Field of Search .................... 395/822–829, 395/474–475, 478, 480, 200.01, 281, 285; 370/85.1

[56] References Cited

U.S. PATENT DOCUMENTS

| | | | |
|---|---|---|---|
| 4,373,181 | 2/1983 | Chisholm et al. | 395/829 |
| 4,380,798 | 4/1983 | Shannon et al. | 395/729 |
| 4,608,562 | 8/1986 | Minor et al. | 340/825.59 |
| 4,773,005 | 9/1988 | Sullivan | 395/829 |
| 4,910,655 | 3/1990 | Ashkin et al. | 395/829 |
| 5,175,822 | 12/1992 | Dixon et al. | 395/829 |
| 5,301,276 | 4/1994 | Kimura | 395/829 |
| 5,317,693 | 5/1994 | Cuenod et al. | 395/829 |
| 5,410,654 | 4/1995 | Foster et al. | 395/474 |
| 5,412,788 | 5/1995 | Collins et al. | 395/484 |
| 5,450,552 | 9/1995 | Michino | 395/281 |

*Primary Examiner*—Gopal C. Ray
*Attorney, Agent, or Firm*—Burns, Doane, Swecker & Mathis, L.L.P.

[57] ABSTRACT

A method for determining whether a bus interface should immediately acknowledge a read request. In one embodiment, devices connected to a plurality of buses are assigned addresses from a first set of addresses or a second set of addresses depending upon whether the device will accept a read request within a predetermined period of time. The bus interface immediately acknowledges a read request directed toward a device with an address in the first set of addresses and delays the acknowledgement for a read request directed toward a device with an address in the second set of addresses.

7 Claims, 2 Drawing Sheets

METHOD OF DYNAMIC SELECTION BETWEEN IMMEDIATE AND DELAYED READ ACCESS ACKNOWLEDGEMENT

FIELD OF THE INVENTION

The present invention relates to a method for dynamically determining whether a bus interface should either immediately acknowledge a read access or withhold acknowledgement of the read access until the bus interface has successfully communicated with a target device.

BACKGROUND OF THE INVENTION

Multiple bus architectures operating within multiple processor system environments have become more common. In such systems, bus interfaces or bridges field transactions from one bus and forward the transactions onto another bus.

The bus interface normally sends acknowledgement signals to a bus after accepting a transaction. FIG. 1 illustrates a situation in which there are two distinct bus domains and immediate address acknowledgement. In the specific example shown, a master device (not shown) in a processor bus domain 12 is attempting to read data out of a slave or target device 16 in a second bus domain 14 (such as a PCI bus) across a bus boundary indicated by the dashed line. In order to perform this read operation, the master device transmits a read access request addressed to the target device 16 via a bus interface 18. The bus interface 18 issues an address acknowledge signal to the processor bus 12 immediately upon receipt of the read access request and then forwards the read access request on to the target device 16. Upon receiving the acknowledge signal, the master device waits for the target device 16 to send the requested data back via the bus interface 18.

In the second bus domain 14, if the target device 16 is presently capable of complying with the read access request, it does so by sending the back the requested data. However, if the target device 16 can not accept the read access request upon receipt, the bus interface 18 will continue to retry the read access in the second bus domain until the target device 16 finally accepts it. The second bus target retries, however, cannot be communicated back to the first processor domain 12 because the first bus is waiting for the read data from the target device 16 and cannot allow more than one transaction to occur at a time. This can lead to other accesses being blocked.

SUMMARY OF THE INVENTION

It is an object of the present invention to provide a method for dynamically determining when a bus interface either should either (1) withhold acknowledgement of a read access request until the bus interface has successfully communicated with a target device or (2) immediately acknowledge the read access request knowing that the read access will always be successful.

According to one embodiment of the present invention, a method for determining whether a bus interface should withhold an address acknowledge signal after receiving a read access request from a first bus until the bus interface has communicated with a target device connected to a second bus is disclosed. In the present invention, the devices attached to the first and second buses are assigned addresses from at least a first and second set of addresses. The addresses are assigned based upon the likelihood that a given device has associated will experience problems completing a read access request within a predetermined period of time. Devices not likely to have problems complying with a read access request in a predetermined period of time are each assigned an address from the first set of addresses while devices which are likely to have problems with a read access request are each assigned an address from the second set of addresses. When the bus interface receives a read access request addressed to a target device, the bus interface determines whether the device address is one of those in the first or second set of addresses. If the address is from the first set of addresses, the bus interface immediately acknowledges the read access request. However, if the address is from the second set of addresses, the bus interface withholds acknowledging the read access until the bus interface communicates with the target device.

BRIEF DESCRIPTION OF THE DRAWINGS

These and other features and advantages of the present invention will be readily apparent to one of ordinary skill in the art from the following written description, used in conjunction with the drawings, in which.

DETAILED DESCRIPTION

The present invention will now be described with reference to a peripheral component interconnect (PCI) bus, and a non-split Power PC Processor Bus (processor bus). However, it will be understood by one of ordinary skill in the art that the present invention applies to a interfaces connecting other types of buses and is not limited to structures which connect a PCI bus and a non-split Power PC Processor Bus.

Figure 1:
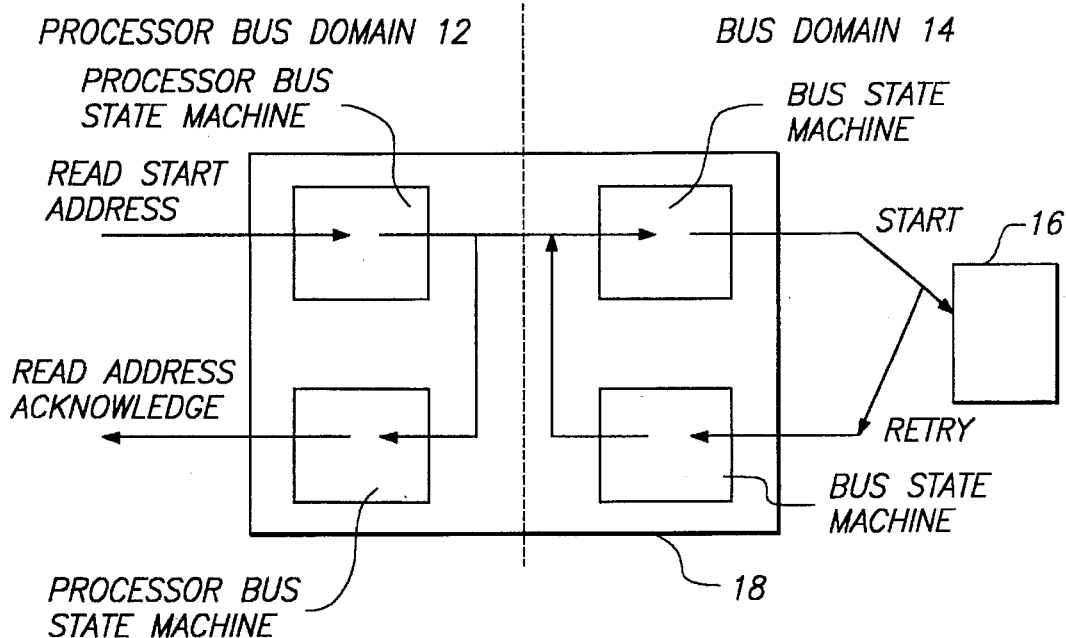
FIG. 1 illustrates a known read access acknowledgement process.
Figure 2:
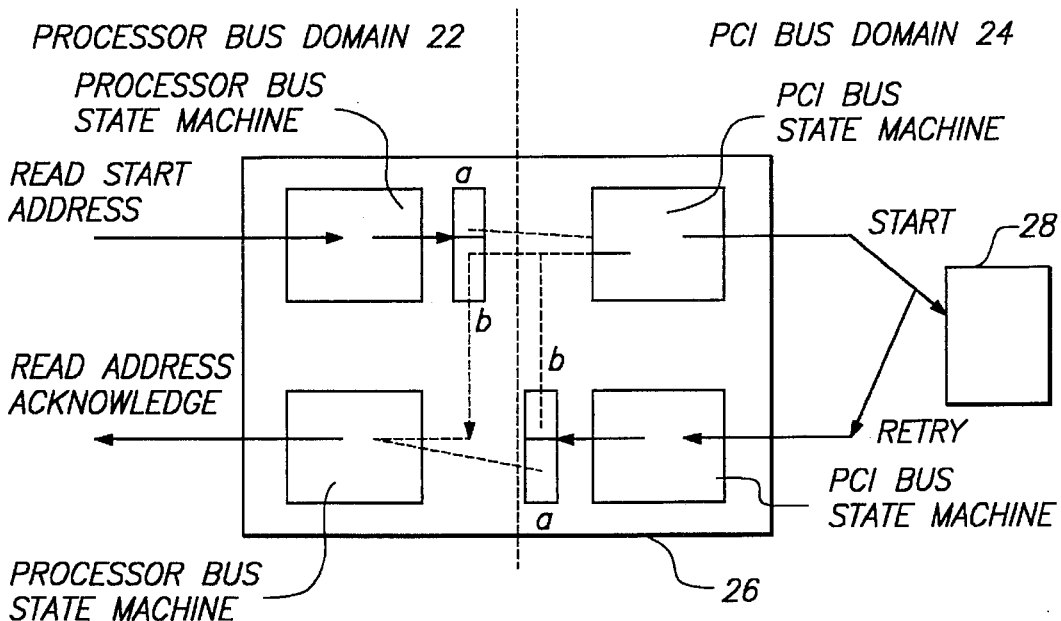
FIG. 2 illustrates a read access acknowledgement process between two buses according to one embodiment of the present invention.

A read access acknowledgement method according to one embodiment of the present invention is illustrated in FIG. 2. In FIG. 2, a processor bus 22 is tied to a PCI bus 24 through a bus interface 26. When a master device (not shown) connected to the processor bus 22 wants to read data out of a slave device 28 attached to the PCI bus 24, the processor bus 22 relays a read access request to the bus interface 26. The read access request includes the address of the target device 28.

According to the present invention, devices attached to the processor bus 22 and the PCI bus 24 are assigned addresses from at least two sets of addresses. The present embodiment uses two different sets of addresses but additional sets could be used. The addresses are assigned based upon whether or not a device may respond to a read access given any number of attempts. Devices which will always complete read accesses are classified as read postable devices and are assigned addresses from the first set of addresses. Devices which may not complete read accesses given any number of attempts are classified as non-read postable devices and are assigned addresses from the second set of addresses.

Figure 3:
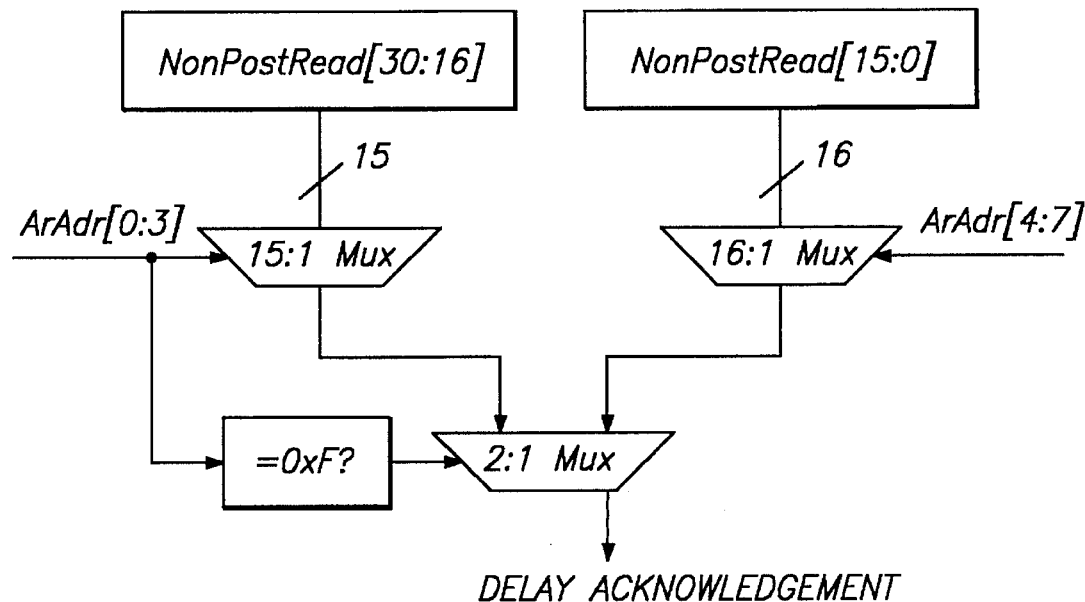
FIG. 3 illustrates a decoding scheme for a look-up of the immediate acknowledge/delayed acknowledge status of an address.
Figure 4:
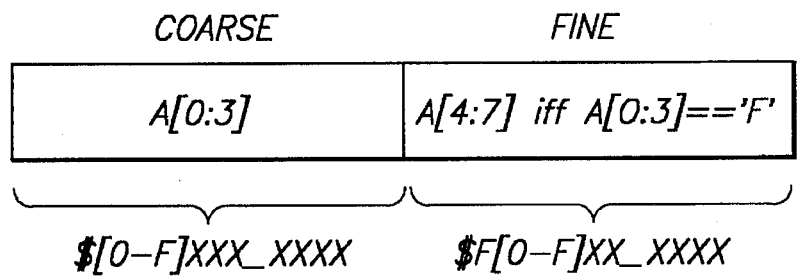
FIG. 4 illustrates a pended read register according to one embodiment of the present invention.

When the bus interface 26 receives a read access request from the processor bus 22, the bus interface 26 analyzes the address of the target device 28 to determine if the target device 28 is a read postable device or a non-read postable device. Using the decoding scheme illustrated in FIG. 3, the bus interface performs a look-up of the postable/non-postable status of an address in a PCI non-posted read register, which is illustrated in FIG. 4. This register defines 16 coarse (256 MByte) regions of the 32-bit address space and 16 fine (16 MByte) regions of the 28 bit address space within the coarse region identified by the four most significant bits being 1. If the transaction is a read cycle and if the bit location corresponding to the processor bus address is a "1", then the bus interface 26 delays its acknowledgement until the cycle has been attempted on the PCI bus 24. However, if the bit location corresponding to the processor bus address is a "0", then the bus interface 26 immediately acknowledges the read access.

A system according to the invention thus permits two modes of address acknowledgement, immediate or delayed. Based on a lookup of the target device address, one pathway, marked "b" in FIG. 2, is taken for accesses in one class of targets (in the example, the posted category devices having addresses marked with a "0" in the register) which will always complete the read access. The bus interface immediately acknowledges read access requests for such devices. Another pathway marked "a" is taken for accesses in another class of targets (in the example, nonposted category devices having addresses marked with a "1" in the register) which may not complete read accesses given any number of attempts. The bus interface delays acknowledgement of a read access request to these devices until they have completed the access or there is a retry. The bus interface passes back the retry to the processor in the processor bus domain if necessary, preventing a blockage.

When the bus interface 26 immediately acknowledges the read access request, the bus interface 26 transmits the read access request to the target device. If the target device can not currently accept the read access, the bus interface will continue attempting to send the read access request to the target device, as illustrated by the right hand dotted line b in FIG. 2, until the target device accepts the read access request. When the read access request is accepted by the target device, the requested data is read out of the target device and transferred to the processor bus 22 through the bus interface 26.

In other words, when the bus interface 26 determines that the target device is a non-read postable device, the bus interface 26 transmits the read access request to the target device without acknowledging the read access request. Since the read access request has not been acknowledged, the processor bus 22 is not committed to completing the access and may still be retried. If the target device accepts the read access request, the bus interface 26 issues an address acknowledge signal to the processor bus 22 which alerts the processor bus that read data is forthcoming. At this point, the processor is free to perform other activities. The bus interface transfers the requested data from the target device to the processor bus 22 when ready. However, if the target device does not accept the read access request, the bus interface 26 issues an address acknowledge signal followed by an address retry signal to the processor bus 22. The address retry signal indicates to the processor bus 22 that the target device did not accept the read access request and thus no data will be forthcoming. The processor bus 22 is then free to either retry the read access request or perform another transaction.

The present invention will be further described by four examples of read access requests between burst/non-burst reads and read postable/non-read postable devices. Burst transactions have a fixed length while non-burst transactions may vary in length.

A processor bus non-burst read to read-postable PCI bus target will now be described. The processor bus asserts a transfer start signal (TS) and the address selects the bus interface. The bus interface acknowledges the processor bus transaction with an address acknowledge signal (AACK) and terminates the processor bus tenure. The bus interface then arbitrates for the PCI bus and when granted, asserts a start valid transfer signal (FRAME) and the address with command/byte enable wires (CBE)=0X6 (memory read) or 0X2 (I/O read). The bus interface asserts the appropriate PCI bus address and byte enables for the given processor bus address alignment and the value of the processor bus transfer size field. When a target-ready (TRDY) signal is asserted, the requested data is available on the PCI bus. The bus interface loads all return read data from the PCI bus and asserts a read data available signal (RDDA) to a processor bus arbiter. If the PCI bus slave retries the transaction or disconnects prior to the transfer of the final data phase, the bus interface will continually reconnect to the PCI bus slave until it can complete its cycle. When the arbiter asserts a slave source/sink data (SSD) signal, a transfer acknowledge signal (TA) is asserted to return the read data to the original master.

A processor bus burst read to read postable PCI bus target will now be described. When the processor bus asserts a transfer start signal (TS) and a transfer burst signal (TBST) and the address selects the bus interface, the bus interface acknowledges the processor bus transaction with an address acknowledge signal (AACK) and terminates the processor bus address tenure. The bus interface arbitrates for the PCI bus and when granted, asserts a start valid transfer signal (FRAME) and the address with the command/byte enable wires (CBE)=0XE (memory read line). For wrapped (critical word first) burst reads, the bus interface does not use the PCI bus burst mode ordering feature. Rather, all 32 bytes of data are received off of the PCI bus before returning the data to the processor bus in the requested order. When a target-ready signal (TRDY) is asserted, and the requested data is available in the PCI bus, the bus interface loads all return read data from the PCI bus and asserts a read data available signal (RDDA) to the processor bus arbiter. If the PCI bus slave retries the transaction or disconnects prior to the transfer of the final data phase, the bus interface will continually reconnect the PCI bus slave until it can complete its cycle. When a slave source/sync data signal (SSD) is asserted by the arbiter, four transfer acknowledge signals (TA) are asserted to return the read data to the original master.

A processor bus non-burst read to a non-read postable PCI bus target will now be described. When the processor bus asserts a transfer start signal (TS) and the address selects the bus interface, the bus interface does not acknowledge the processor bus transaction, and does not terminate the processor bus address tenure. The bus interface forwards the read transaction to the PCI bus to attempt to complete the read access with the target. The bus interface arbitrates for the PCI bus and when granted, asserts a start a valid transfer signal (FRAME) and the address with the command/byte enable wires (CBE)=0X6 (memory read) or 0X2 (I/O read). The bus interface asserts the appropriate PCI bus address and the byte enables for the given processor bus address alignment and the value of the processor bus transfer size field. If the target responds by concurrently asserting a stop transfer signal (STOP) and deasserting a target-ready signal (TRDY) prior to the completion of the first data phase, the bus interface returns an address acknowledge signal (AACK) with an address retry signal (ARTRY) to the processor bus. The bus interface does not reattempt to access the PCI bus target, i.e., the transaction is complete. However, if the target completes the first data phase by concurrently asserting a target-ready signal (TRDY), and deasserting a stop (STOP) transfer signal, then the bus interface returns an address acknowledge signal (AACK) without an address retry signal (ARTRY) to the processor bus. At this point, the bus interface is committed to completing the entire transaction. When the target-ready signal (TRDY) is asserted for the final data phase, the requested data is available in the PCI bus. The bus interface loads all return read data from the PCI bus and asserts a read data available signal (RDDA) to the processor bus arbiter. If the PCI bus slave retries subsequent portions of the transaction or disconnects prior to the transfer of the final data phase, the bus interface will continually reconnect to the PCI bus slave until it can complete its cycle. When the arbiter asserts a slave source/sink data signal (SSD) a transfer acknowledge (TA) signal is asserted, returning the read data to the processor bus master.

A processor bus burst read to a non-read postable PCI bus target will now be described. When the processor bus asserts a transfer start signal (TS) and a transfer burst signal (TBST) and the address selects the bus interface, the bus interface does not acknowledge the processor bus transaction and does not terminate the processor bus address tenure. The bus interface forwards the transaction to the PCI bus to attempt to complete the read access with the target. The bus interface arbitrates for the PCI bus and when granted, asserts a start valid transfer signal (FRAME) and the address with command/byte enable wires (CBE)=0XE (memory read line). For wrapped (critical word first) burst reads, the bus interface does not use the PCI bus burst mode ordering feature. Rather, all 32 bytes of data are received off of the PCI bus before returning the data to the processor bus in the requested order. The bus interface asserts all byte enables. If the target responds by concurrently asserting a stop transfer signal (STOP) and deasserting a transfer ready signal (TRDY) prior to the completion of the first data phase, then the bus interface returns an address acknowledge signal with an address retry signal to the processor bus. The bus interface does not reattempt to access the PCI target, i.e., the transaction is complete. If the target completes the first data phase by concurrently asserting a transfer ready signal (TRDY) and deasserting a stop transfer signal, then the bus interface returns an address acknowledge signal (AACK) without an address retry signal to the processor bus. At this point, the bus interface is committed to completing the entire transaction. When the transfer ready signal (TRDY) is asserted for the final data phase, the requested data is available on the PCI bus. The bus interface loads all return read data from the PCI bus and asserts a read data available signal (RDDA) to the processor bus arbiter. The PCI bus slave retries subsequent portions of the transaction or disconnects prior to the transfer of the final data phase, the bus interface will continually reconnect to the PCI bus slave until it can complete its cycle. When a slave source/sink data signal (SSD) is asserted by the arbiter, four transfer acknowledgement signals (TA) are asserted, returning the read data to the master.

It will be appreciated by those of ordinary skill in the art that the present invention can be embodied in other specific forms without departing from the spirit or essential character thereof. The presently disclosed embodiments therefore considered in all respects to be illustrative and not restrictive. The scope of the invention is indicated by the appended claims rather than the foregoing description and all changes which come within the meaning and range of equivalents thereof are intended to be embraced therein.

I claim:

1. A method for determining whether a bus interface should withhold an acknowledgement signal acknowledging a read access request until after the bus interface has communicated with a device, comprising the steps of:

assigning an address from one of a first set of addresses or a second set of addresses to the device;

receiving a read access request containing an address of the device from a master bus;

determining whether said device address is from said first set of addresses or from said second set of addresses;

transmitting the acknowledgement signal in response to said read access request to said master bus when said device address is from said first set of addresses; and withholding the acknowledgement signal when said device address is from said second set of addresses until said bus interface communicates with said device.

2. A method according to claim 1, wherein a device is assigned an address in said first set of addresses if the device always completes the read access.

3. A method according to claim 1, wherein a device is assigned an address in said second set of addresses if the device may not complete the read access.

4. A method for attempting a read access between a master bus and a slave bus through a bus interface, wherein each device attached to said slave bus has been assigned an address from one of two sets of addresses, comprising the steps of:

receiving a read access request at said bus interface, said read access request containing a target device address;

determining whether said target device address is from a first set of addresses;

acknowledging said read access request when said target device address is from said first set of addresses and then completing said read access request with said target device; and transmitting said read access request to said target device without acknowledging said read access request when said target device address is in the second set of addresses, wherein said bus interface does not acknowledge the read access request until after the bus interface receives signals from said target device.

5. A method according to claim 4, wherein an acknowledgement signal and an address retry signal are sent to said master bus when said target device does not accept the read access request.

6. A method according to claim 4, wherein a device is assigned an address in said first set of addresses if the device will respond to the read access request within a predetermined period of time.

7. A method according to claim 4, wherein a device is assigned an address in the second set of addresses if the device has problems responding to the read access request within a predetermined period of time.

\* \* \* \* \*